United States Patent [19]
Nakamura et al.

[11] Patent Number: 5,637,051
[45] Date of Patent: Jun. 10, 1997

[54] POWER TRANSMISSION

[75] Inventors: Hideaki Nakamura, Atsugi; Toshiro Ichikawa, Hiratsuka, both of Japan

[73] Assignee: Unisia Jecs Corporation, Atsugi, Japan

[21] Appl. No.: 594,716

[22] Filed: Jan. 31, 1996

[30] Foreign Application Priority Data

Feb. 13, 1995 [JP] Japan .................................. 7-023596

[51] Int. Cl.$^6$ ........................................................ F16H 1/28
[52] U.S. Cl. ............................................. 475/301; 475/317
[58] Field of Search ................................... 475/301, 317

[56] References Cited

FOREIGN PATENT DOCUMENTS 5-202995  8/1993  Japan ................................... 475/301
6-32802   4/1994  Japan .

*Primary Examiner*—Dirk Wright
*Attorney, Agent, or Firm*—Foley & Lardner

[57] ABSTRACT

A power transmission comprises a first coil spring wound to a casing and a first drum and having the diameter to be extended by rotation of an internal gear in one direction, a second coil spring wound to the casing and a second drum and having the same winding direction as the first coil spring and the diameter to be extended by rotation of the internal gear in the other direction, and cylinder members arranged on outer peripheries of the first and second coil springs for serving to restrict extension of the diameter of the first and second coil springs, the cylinder members being rotatable relative to the internal gear.

7 Claims, 3 Drawing Sheets

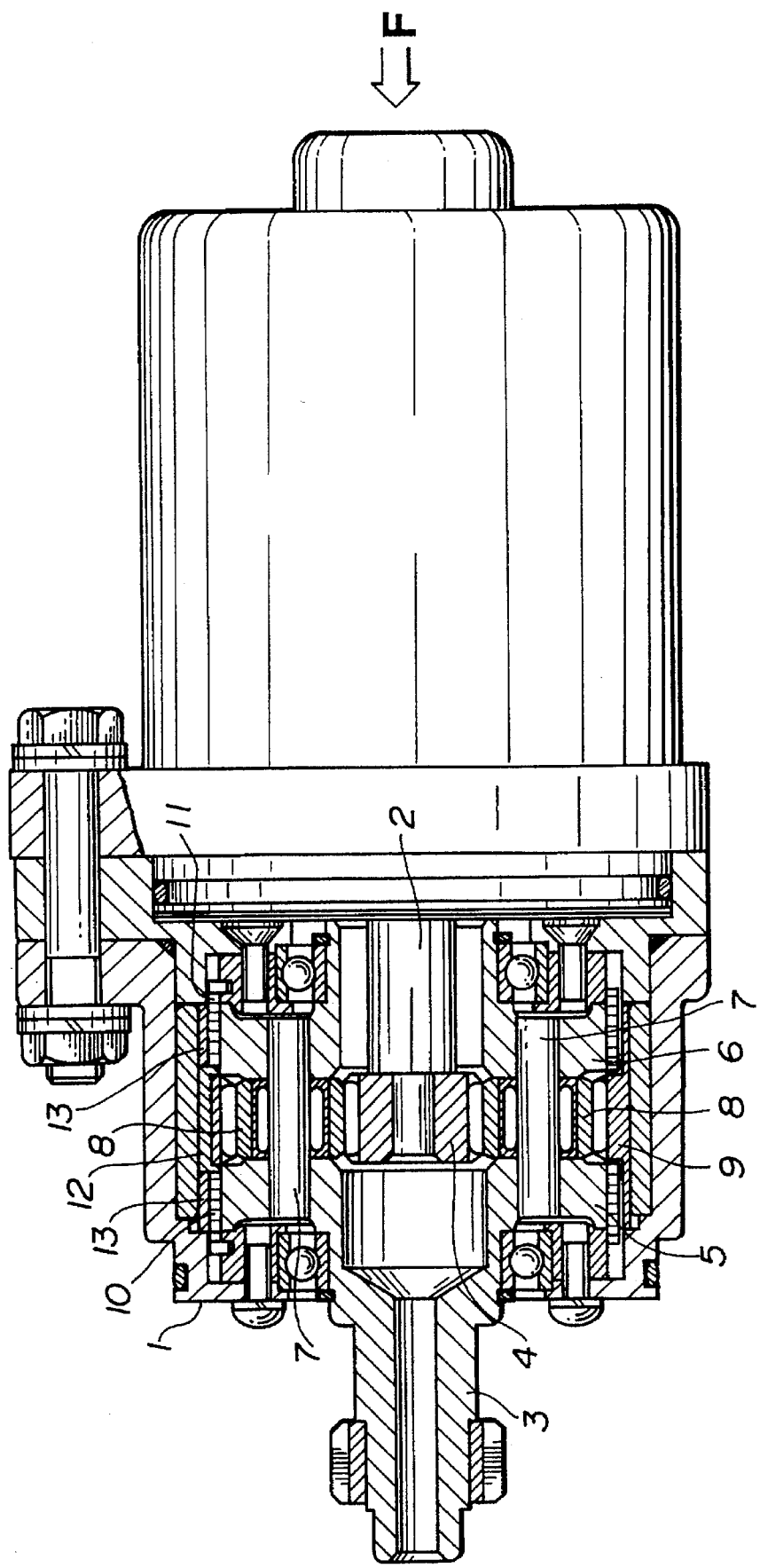

POWER TRANSMISSION

BACKGROUND OF THE INVENTION

The present invention relates generally to a power transmission used, for example, in a steering system of a motor vehicle and more particularly, to the power transmission which allows transmission of torque from an input shaft to an output shaft, and prevents transmission of torque from the output shaft to the input shaft.

Generally, a rear wheel steering apparatus of a front/rear wheel steering motor vehicle includes a power transmission interposed between an input shaft and an output shaft and for preventing transmission of load input from tires due to road irregularities, cornering force produced upon turning of the vehicle, etc. to a driving gear such as a motor.

Such power transmission is disclosed, for example, in JP-U 6-32802. Referring to FIG. 3, a brief description will be made with regard to this power transmission.

Coaxially and rotatably accommodated in a casing 1 are an input shaft 2 and an output shaft 3, the input shaft 2 having an end with which a sun gear 4 is integrated, the output shaft 3 having an end with which a first drum 5 is integrated. The first drum 5 and the second drum 6 are coaxially integrally coupled with each other by connecting shafts 7. Planetary gears 8 are rotatably supported to the connecting shafts 7 for coupling the first and second drums 5, 6, and are meshed with the sun gear 4. An internal gear 9 is meshed with the planetary gears 8.

A first coil spring 10 and a second coil spring 11, both having the same winding direction, are wound on outer peripheral surfaces of the first drum 5 and the second drum 6, respectively. As for the winding direction, suppose that the first and second coil springs 10, 11 are both wound counterclockwise from the side of an arrow F in FIG. 3 to the front thereof. The first and second coil springs 10, 11 have one ends engaged with end walls of the casing 1, and the other ends contacting a stopper 12 integrally mounted to the internal gear 9 upon set rotation thereof. Specifically, by way of example, when the internal gear 9 is rotated counterclockwise (as viewed from the direction of the arrow F in FIG. 3. Hereafter, the direction of rotation of parts is viewed from the direction of the arrow F) by a set amount, the stopper 12 contacts the other end of the first coil spring 10 to extend the first coil spring 10. On the other hand, when the internal gear 9 is rotated clockwise by a set amount, the stopper 12 contacts the other end of the second coil spring 11 to extend the second coil spring 11.

Integrally formed with the internal gear 9 is a cylinder portion 13 for enclosing outer peripheries of the first and second coil springs 10, 11. The cylinder portion 13 does not contact the first and second coil springs 10, 11 in the initial state, whereas it contacts outer peripheral surfaces of the coil spring 10, 11 when extended by a predetermined amount in the way as described above so as to restrict the amount of extension of the diameter of the coil spring 10, 11.

The power transmission is constructed as described above, so that when the input shaft 2 receives clockwise torque against load of the output shaft 3, the planetary gears 8 rotate on the connecting shafts 7 with rotation of the sun gear 4, which produces counterclockwise rotation of the internal gear 9 meshed with the planetary gears 8 to extend the first coil spring 10. Thus, lock of clockwise rotation of the first drum 5, which is ensured by winding of the first coil spring 10 initially, is released immediately. As a result, the planetary gears 8 revolve around the sun gear 4 to allow transmission of torque that the input shaft 2 receives to the output shaft 3 through the first and second drums 5, 6. On the other hand, when the input shaft 2 receives counterclockwise torque against load of the output shaft 3, the planetary gears 8 rotate on the connecting shafts 7 in the same way as described above, which produces clockwise rotation of the internal gear 9 to extend the second coil spring 11. Thus, lock of the second drum 6 is released to allow transmission of torque to the output shaft 3.

Moreover, when the input shaft 2 receives torque in a predetermined direction, and the output shaft 3 receives heavy load torque in the same direction at the same time, rotation of the internal gear 9 is reversed as soon as torque of the output shaft 3 is input to the first and second drums 5, 6. This releases extension of the diameter of the first coil spring 10 or the second coil spring 11. As a result, rotation of the first and second drums 5, 6 is locked to prevent transmission of torque from the output shaft 3 to the input shaft 2.

As for the known power transmission, when extension of the diameter of the coil spring 10 (11) is not carried out sufficiently by the internal gear 9, which occurs, e.g. when torque that the input shaft 2 receives and load torque of the output shaft 3 have the same direction, frictional engagement and slippage, i.e. so-called sticking slippage, are discontinuously produced between the extended coil spring 10 (11) and the corresponding drum 5 (6). This produces vibrations which may cause wear of an external surface of the drum 5 (6), resulting in a lowering of the power transmission performance. Thus, conventionally, in order to restrain occurrence of the above sticking slippage, lubricating oil is put between the coil spring 10 (11) and the corresponding drum 5 (6).

However, if lubricating oil is put between the coil spring 10 (11) and the corresponding drum 5 (6) in such a way, the following inconvenience occurs. Upon transmission of torque from the input shaft 2 to the output shaft 3, the coil spring 10 (11) on the side of allowing idling of the drum 5 (6) in being extended slightly outwardly by rotation of the drum 5 (6) tends to be extended further outwardly due to a viscous resistance of lubricating oil. If the amount of extension of the coil spring 5 (6) is greater, the outer peripheral surface of the coil spring 10 (11) comes into contact with an inner peripheral surface of the cylinder portion 13 integrated with the internal gear 9. In that state, if the output shaft 3 receives load torque greater than torque that the input shaft 2 receives and having the same direction, for example, the inner peripheral surface of the cylinder portion 13 integrated with the internal gear 9 is frictionally engaged with the coil spring 10 (11) when rotation of the internal gear 9 is about to be reversed as described above. Thus, before the coil spring 11 (10) which has been extended by the internal gear 9 is fully rewound on the drum 5 (6), the two coil springs 10, 11 balance with each other in the circumferential direction through the internal gear 9 and the cylinder portion 13. As a result, the coil springs 10, 11 are not rewound on the first and second drums 5, 6 thereafter, lowering the cutoff performance with respect to torque that the output shaft 3 receives.

It is, therefore, an object of the present invention to provide a power transmission which always stably ensures the cutoff performance with respect to torque that the output shaft receives.

SUMMARY OF THE INVENTION

According to one aspect of the present invention, there is provided a power transmission, comprising:

a casing;

input and output shafts coaxially rotatably supported by said casing;

a sun gear integrated with said input shaft;

a first drum integrated with said output shaft;

a second drum arranged opposite to said first drum through said sun gear, said second drum being coaxially connected to said first drum by connecting shafts;

planetary gears supported by said connecting shafts and meshed with said sun gear;

an internal gear meshed with said planetary gears;

a first coil spring wound to said casing and said first drum in the normal condition, said first coil spring having a diameter to be extended by rotation of said internal gear in one direction;

a second coil spring wound to said casing and said second drum in the normal condition, said second coil spring having the same winding direction as said first coil spring, said second coil spring having a diameter to be extended by rotation of said internal gear in the other direction; and cylinder members arranged on outer peripheries of said first coil spring and said second coil spring, said cylinder members serving to restrict extension of said diameter of said first coil spring and said second coil spring, said cylinder members being rotatable relative to said internal gear.

Another aspect of the present invention lies in providing a power transmission, comprising:

a casing;

input and output shafts coaxially rotatably supported by said casing;

a sun gear integrated with said input shaft;

a first drum integrated with said output shaft;

a second drum arranged opposite to said first drum through said sun gear, said second drum being coaxially connected to said first drum by connecting shafts;

planetary gears supported by said connecting shafts and meshed with said sun gear;

an internal gear meshed with said planetary gears;

a first coil spring wound to said casing and said first drum in the normal condition, said first coil spring having a diameter to be extended by rotation of said internal gear in one direction;

a second coil spring wound to said casing and said second drum in the normal condition, said second coil spring having the same winding direction as said first coil spring, said second coil spring having a diameter to be extended by rotation of said internal gear in the other direction; and means, arranged on outer peripheries of said first coil spring and said second coil spring, for restricting extension of said diameter of said first coil spring and said second coil spring, said restricting means being rotatable relative to said internal gear.

BRIEF DESCRIPTION OF THE DRAWINGS

FIG. 3 is a view similar to FIG. 1, showing a known power transmission.

DETAILED DESCRIPTION OF THE INVENTION

Figure 1:
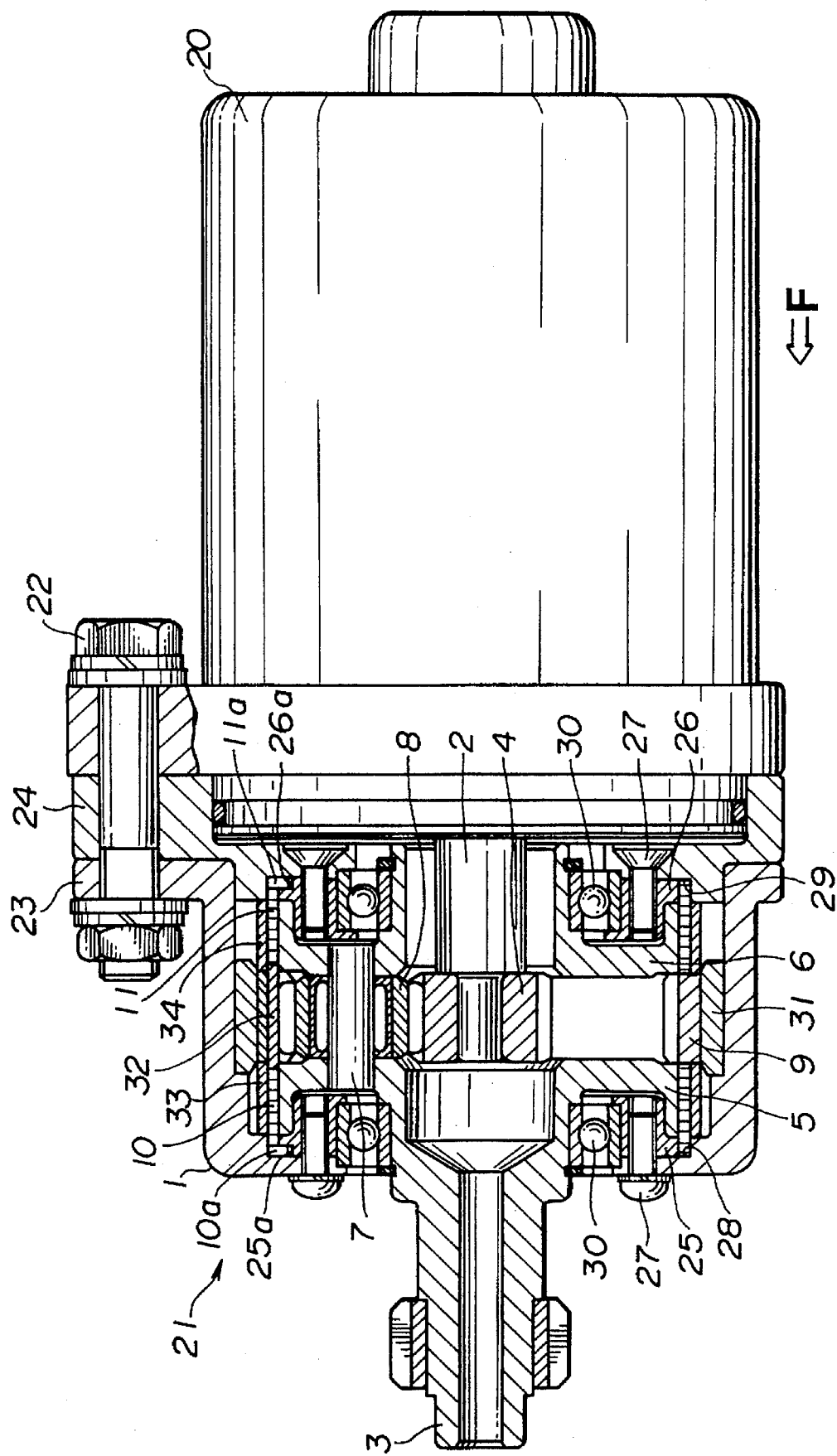
FIG. 1 is a sectional view showing a preferred embodiment of a power transmission according to the present invention.

Referring to the drawings wherein like reference numerals designate like parts throughout the views, referring particularly to FIGS. 1 and 2, a description will be made with regard to a preferred embodiment of a power transmission according to the present invention.

Figure 2:
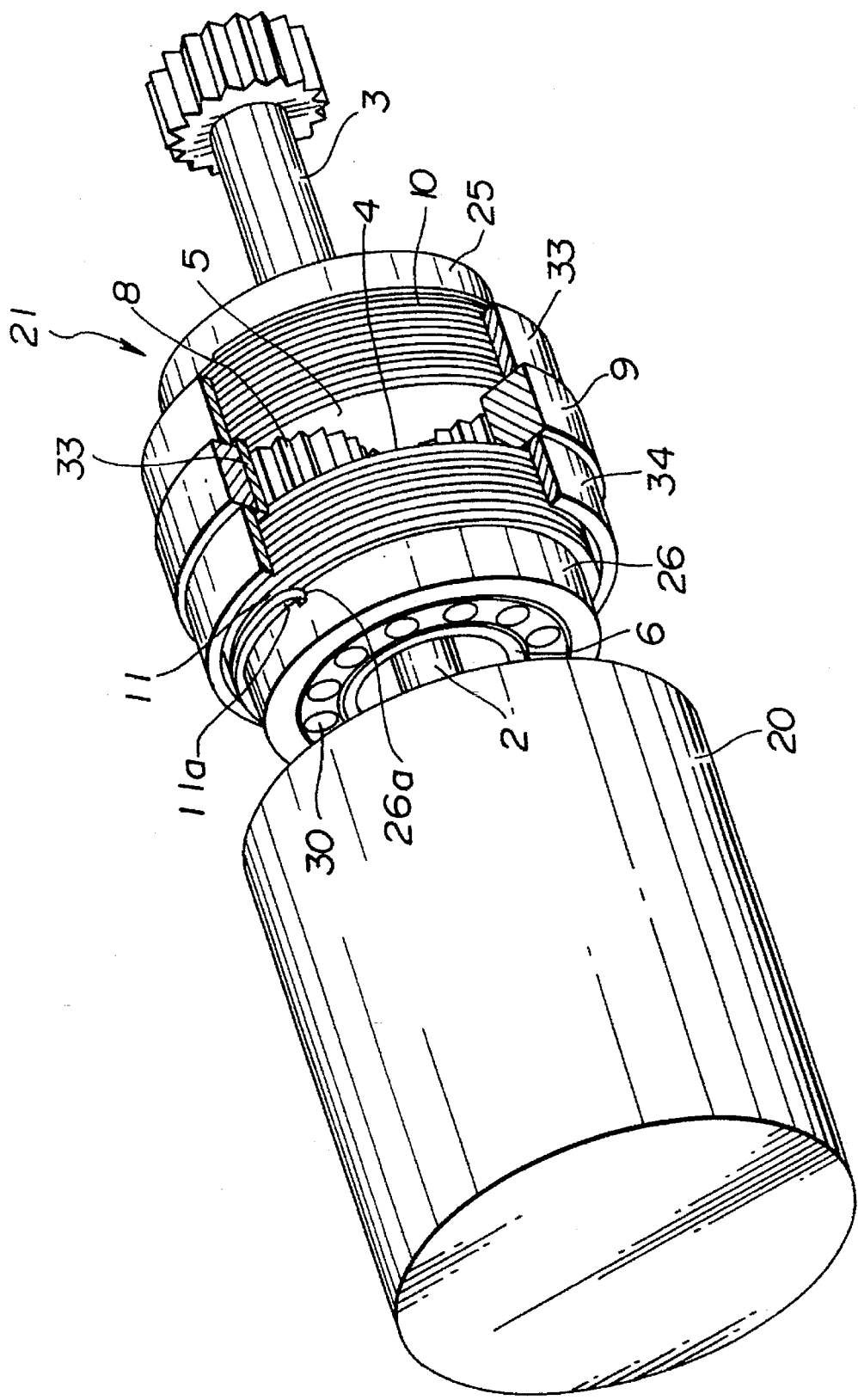
FIG. 2 is a fragmentary sectional perspective view, with part of a casing removed, showing the power transmission.

Referring to FIGS. 1 and 2, a reference numeral 20 designates a motor as a driving gear, having a shaft which corresponds to an input shaft 2 in this embodiment. A reference numeral 21 designates a power transmission according to the present invention. A reference numeral 1 designates a casing of the power transmission 21 connected to an end of the motor 20 by a bolt/nut 22. The casing 1 serves to coaxially rotatably accommodate ends of the input shaft 2 and an output shaft 3, and comprises a main body 23, a cover 24, and stationary drums 25, 26. The stationary drums 25, 26 are mounted to end walls of the casing main body 23 and the cover 24 screws 27 so as to form annular grooves 28, 29 with inner peripheral walls of the casing main body 23 and the cover 24.

Integrally coupled with an end of the input shaft 2 placed in the casing 1 is a sun gear 4 with which planetary gears 8 are engaged. An internal gear 9 is engaged with the planetary gears 8. A first drum 5 is integrally formed with an end of the output shaft 3 placed in the casing 1, and a second drum 6 is disposed in a position opposite to the first drum 5 through the sun gear 4. The first and second drums 5, 6 are rotatably supported to the casing 1 bearings 30, respectively, and are coaxially coupled with each other by connecting shafts 7. The planetary gears 8 are rotatably supported to the connecting shafts 7. An outer peripheral surface of the internal gear 9 is rotatably supported by a dry bearing 31 press fitted in the casing 1.

A first coil spring 10 and a second coil spring 11 are wound on the stationary drum 25 and first drum 5 and the stationary drum 26 and second drum 6 on outer peripheries thereof, respectively. The first coil spring 10 and the second coil spring 11 are wound in the same direction, and have one ends to which bend portions 10a, 11a are arranged to be radially inwardly bent. As for the winding direction, suppose that the first and second coil springs 10, 11 are both wound counterclockwise from the side of an arrow F in FIG. 1 to the front thereof. The bend portions 10a, 11a are arranged through holes 25a, 26a formed in the outer peripheral surfaces of the stationary drums 25, 26, respectively, by which one ends of the first and second coil springs 10, 11 are engaged with the casing 1.

A stopper pin 32 is mounted to the internal gear 9 in the way to axially extend therethrough. The stopper pin 32 has two ends which are engaged with the other ends of the first and second coil springs 10, 11 upon set rotation of the internal gear 9. Specifically, the two ends of the stopper pin 32 are placed on rotation paths of the other ends of the first and second coil springs 10, 11, and are constructed so as not to contact, in the initial state, the other ends of the first and second coil springs 10, 11 at the same time. As a result, the stopper pin 32 always starts extension of the diameter of the first and second coil springs 10, 11 in a preset rotation position of the internal gear 9.

Cylinder members 33, 34 are arranged at outer peripheries of the first and second coil springs 10, 11 to restrict extension of the diameter thereof. Each cylinder member 33, 34 is interposed between the internal gear 9 and the end wall of the casing 1 to enable relative rotation with respect to the two, and has at one end an outer peripheral edge held by the dry bearing 31. In order to enable relative rotation with respect to the internal gear 9 and the end wall of the casing 1, each cylinder member 33, 34 needs only to be arranged with a predetermined clearance with respect to the two. It is noted that this clearance should be determined below the diameter of the coil springs 10, 11 so that the end of each is not introduced therein.

Lubricating oil is placed between the coil springs 10, 11 and the drums 5, 6 to prevent occurrence of so-called sticking slippage therebetween upon power transmission.

The power transmission 21, which is constructed as described above, operates as follows. It is noted that in a subsequent description, the direction of rotation of parts is viewed from the direction of the arrow F in FIG. 1.

When the input shaft 2 receives clockwise torque against load of the output shaft 3, since clockwise rotation of the first and second drums 5, 6 is initially locked by the first coil spring 10, the planetary gears 8 rotate on the connecting shafts 7, so that the internal gear 9 meshed with the planetary gears 8 is rotated in the direction opposite to the input shaft 2, i.e. counterclockwise. When the internal gear 9 is rotated counterclockwise in such a way, one end of the stopper pin 32 integrally mounted to the internal gear 9 is engaged with the other end of the first coil spring 10 to extend the diameter thereof. This rotation of the internal gear 9 is stopped as soon as nearly all area of the outer peripheral surface of the first coil spring 10 contacts the inner peripheral surface of the cylinder member 33. When the first coil spring 10 is fully extended in such a way, lock of the first drum 5 is released to allow transmission of torque of the input shaft 2 to the output shaft 3 through revolution of the planetary gears 8.

On the other hand, when the input shaft 2 receives counterclockwise torque against load of the output shaft 3, the internal gear 9 is rotated in the direction opposite to that as described above, i.e. clockwise, the other end of the stopper pin 32 is engaged with the other end of the second coil spring 11 to extend the diameter thereof. Thus, lock of the first and second drums 5, 6 is released to allow transmission of torque of the input shaft 2 to the output shaft 3 through revolution of the planetary gears 8.

Moreover, when the input shaft 2 receives clockwise or counterclockwise torque, and the output shaft 3 receives torque in the same direction at the same time, the coil spring 10 (or 11) having the diameter extended by the internal gear 9 through the stopper pin 32 is reduced in diameter again, so that the drum 5 (or 6) is locked by winding of the coil spring 10 (or 11). As a result, torque is not transmitted from the output shaft 3 to the input shaft 2.

When the input shaft 2 receives clockwise or counterclockwise torque against load of the output shaft 3 as described above, the coil spring 11 (or 10) is slightly outwardly extended by the drum 6 (or 5) to allow idling thereof. At that time, the diameter of the coil spring 11 (or 10) may further be extended due to a viscous resistance of lubricating oil, etc. to produce contact of the outer peripheral surface thereof with the inner peripheral surface of the cylinder member 34 (or 33). However, the cylinder member 34 (or 33) is a member different from the internal gear 9, and besides it is rotatable relative to the internal gear 9 and the end wall of the casing 1, so that even if load torque of the output shaft 3 is reversed immediately after this, the two coil springs 10, 11 cannot balance with each other in the circumferential direction with the diameter extended.

This operation will be described concretely. Suppose that the input shaft 2 receives clockwise torque against load of the output shaft 3, and at that time, the second coil spring 11 for allowing idling of the second drum 6 contacts the inner peripheral surface of the cylinder member 34. If the cylinder member 34 is integrated with the internal gear 9, rotation of the cylinder member 34 is reversed, when load torque of the output shaft 3 is reversed immediately after this, together with the internal gear 9 to further extend the diameter of the second coil spring 11. Thus, spring force of the second coil spring 11 can balance spring force of the first coil spring 10 in the circumferential direction through the cylinder member 34 and the internal gear 9. However, in case of the power transmission 21 of the present invention, the cylinder member 34 is rotatable relative to the internal gear 9, so that even if load torque of the output shaft 3 is reversed immediately after the second coil spring 11 contacts the inner peripheral surface of the cylinder member 34, the cylinder member 34 cannot be rotated together with the internal gear 9. As a result, the second coil spring 11 cannot further be extended in diameter, nor balance with the first coil spring 10 in the circumferential direction. Moreover, in case of the power transmission 21 of the present invention, the cylinder member 34 is also rotatable relative to the casing 1, so that when contacted by the second coil spring 11, the cylinder member 34 idles to more surely prevent extension of the diameter of the second coil spring 11. Likewise, when the input shaft 2 receives counterclockwise torque against load of the output shaft 3, and rotation of the internal gear 9 is reversed with reverse rotation of load torque, circumferential balance of the two coil springs 10, 11 can be prevented in the same way as described above.

Accordingly, as for the power transmission 21 of the present invention, since the first and second coil springs 10, 11 do not balance with each other in the circumferential direction with the diameter extended, transmission of torque from the output shaft 3 to the input shaft 2 can always be cut off surely.

Having described the present invention in connection with the preferred embodiment, it is noted that the present invention is not limited thereto, and various changes and modifications can be made without departing from the spirit of the present invention. By way of example, in the above embodiment, the cylinder members 33, 34 are disposed to be rotatable relative to the casing 1, alternatively, they may integrally be mounted thereto. In that case, the clearance between the cylinder members 33, 34 and the internal gear 9 can easily be controlled.

What is claimed is:

1. A power transmission, comprising:

a casing;

input and output shafts coaxially rotatably supported by said casing;

a sun gear integrated with said input shaft;

a first drum integrated with said output shaft;

a second drum arranged opposite to said first drum through said sun gear, said second drum being coaxially connected to said first drum by connecting shafts;

planetary gears supported by said connecting shafts and meshed with said sun gear;

an internal gear meshed with said planetary gears;

a first coil spring wound to said casing and said first drum in the normal condition, said first coil spring having a diameter to be extended by rotation of said internal gear in one direction;

a second coil spring wound to said casing and said second drum in the normal condition, said second coil spring having the same winding direction as said first coil spring, said second coil spring having a diameter to be extended by rotation of said internal gear in the other direction; and cylinder members arranged on outer peripheries of said first coil spring and said second coil spring, said cylinder members serving to restrict extension of said diameter of said first coil spring and said second coil spring, said cylinder members being rotatable relative to said internal gear.

2. A power transmission as claimed in claim 1, wherein said cylinder members are rotatable relative to said casing.

3. A power transmission as claimed in claim 2, wherein said cylinder members are fixedly mounted to said casing.

4. A power transmission, comprising:

a casing;

input and output shafts coaxially rotatably supported by said casing;

a sun gear integrated with said input shaft;

a first drum integrated with said output shaft;

a second drum arranged opposite to said first drum through said sun gear, said second drum being coaxially connected to said first drum by connecting shafts;

planetary gears supported by said connecting shafts and meshed with said sun gear;

an internal gear meshed with said planetary gears;

a first coil spring wound to said casing and said first drum in the normal condition, said first coil spring having a diameter to be extended by rotation of said internal gear in one direction;

a second coil spring wound to said casing and said second drum in the normal condition, said second coil spring having the same winding direction as said first coil spring, said second coil spring having a diameter to be extended by rotation of said internal gear in the other direction; and means, arranged on outer peripheries of said first coil spring and said second coil spring, for restricting extension of said diameter of said first coil spring and said second coil spring, said restricting means being rotatable relative to said internal gear.

5. A power transmission as claimed in claim 4, wherein said restricting means are rotatable relative to said casing.

6. A power transmission as claimed in claim 5, wherein said restricting means are fixedly mounted to said casing.

7. A power transmission as claimed in claim 6, wherein said restricting means include a cylinder member.

* * * * *